May 17, 1949.   J. H. BOOTH   2,470,210
HIGH ANGLE JOINT ASSEMBLY
Filed Oct. 28, 1944
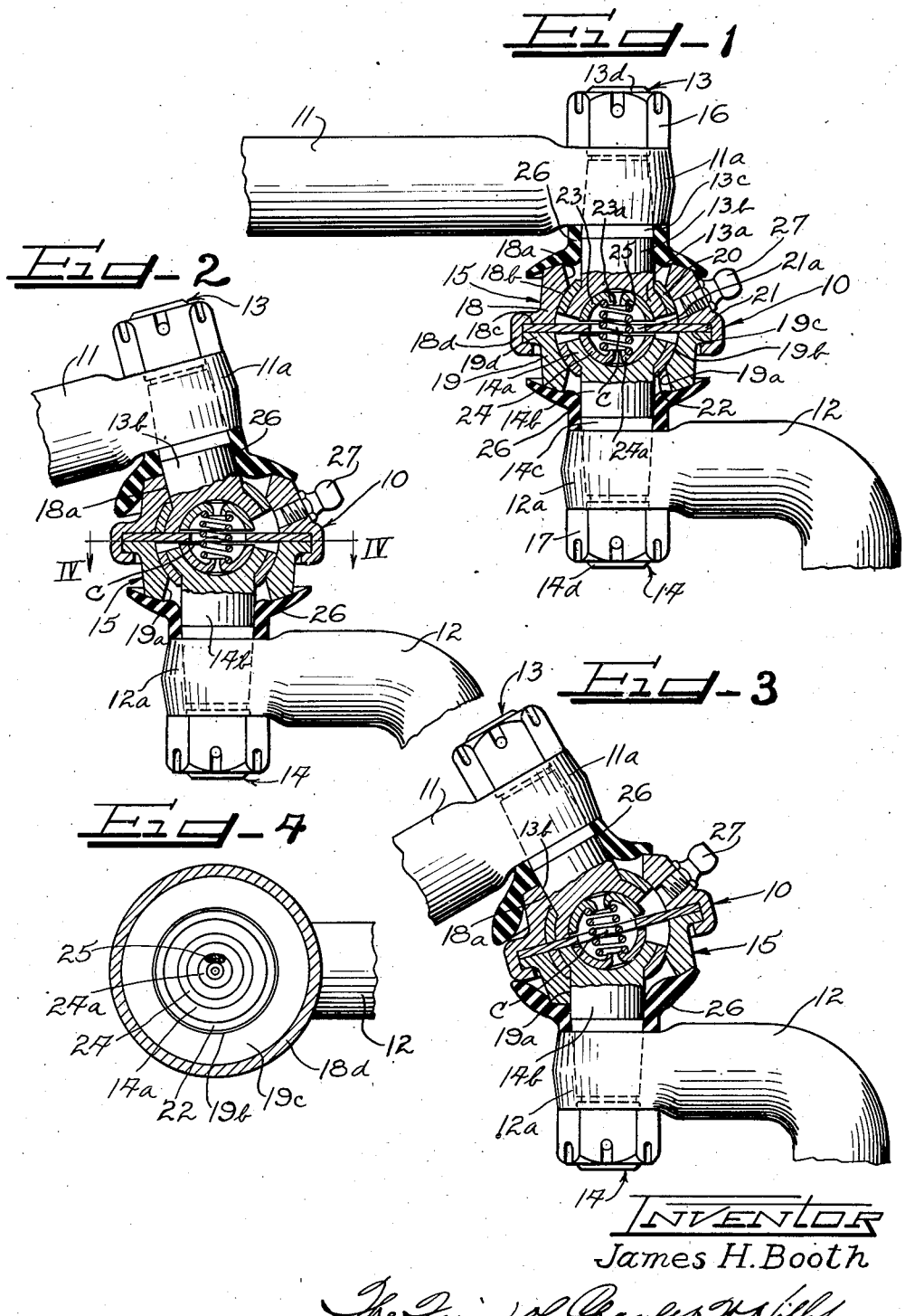
Inventor
James H. Booth Patented May 17, 1949

2,470,210

UNITED STATES PATENT OFFICE 2,470,210

HIGH-ANGLE JOINT ASSEMBLY

James H. Booth, Detroit, Mich., assignor to Thompson Products, Inc., Cleveland, Ohio, a corporation of Ohio Application October 28, 1944, Serial No. 560,807

9 Claims. (Cl. 287—90)

1

This invention relates to joint assemblies which accommodate articulate movements throughout a wide angular range.

Specifically the invention deals with a tie rod joint which includes a floating housing part connecting a plurality of studs so that the studs can move through a wide angular range without requiring the use of large heads on the studs.

While the invention will be hereinafter specifically described as embodied in a tie rod joint for use between the tie rod and steering arm of a steering assembly for automotive vehicles, it should be understood that the high angle joints of this invention are generally useful in any assembly wherein two parts are to be joined in articulate relation.

Heretofore, the sockets or housings of tie rod joints were rigidly connected to the tie rods while the studs of such joints were connected to the steering arms of automotive vehicles. If the steering linkage was such that the tie rod had to move throughout a wide angular range, the tie rod joints had to be equipped with large sockets having openings sufficiently large so that the shanks of the joint studs would not strike against the housings or sockets. In addition, the studs had to have large heads so that they would not be pulled through the large openings of the sockets or housings. The manufacture of studs, and especially ball studs having large heads, is quite expensive since these studs must be lathe-turned because the metal cannot be upset sufficiently to form a large head. As a result, much metal was wasted in turning down a large diameter rod to provide a reduced-diameter shank having a large diameter ball end.

The present invention now eliminates the requirement for large sockets or housings and large heads on tie rod joint studs.

According to the invention, a joint assembly is provided with a pair of studs projecting from opposite ends of a single housing. One stud is secured to the tie rod of a steering assembly, while the other stud is attached to the steering arm of the assembly. The housing floats between the two studs and the arrangement is such that when one of the studs has been tilted into abutting relation with the housing, it then tilts the housing therewith so that a higher degree of angular movement can be obtained. Both studs have a common tilting axis so that the effective length of the linkage is never changed irrespective of the tilted positions assumed by the studs and housing.

An important feature of the invention resides

2 in the arrangement of a plurality of tilting studs in a housing so that each one of the studs tilts about the same common center point.

A further feature of the invention resides in the provision of a tie rod joint which accommodates a wide range of angular movements and still does not require the use of large stud heads.

An object of the invention is to provide an articulate linkage assembly accommodating a wide range of angular movements without changing the effective length of the assembly.

A still further object of the invention is to provide a joint with a floating housing which is tilted whenever angular movements in excess of a predetermined angle are encountered.

A still further object of the invention is to provide an arrangement of studs in a single housing so that each stud can tilt throughout a predetermined angular range and can then move the housing therewith for tilting it on the other stud to increase the predetermined angular range.

A specific object of the invention is to provide a tie rod joint for automotive vehicles which is adapted to transmit steering forces throughout a wide degree of angular movement without affecting the steering movement.

Other and further objects of the invention will be apparent to those skilled in the art from the following detailed description of the annexed sheet of drawings which, by way of preferred example only, illustrates one embodiment of the invention.

On the drawings:

Figure 1 is a side elevational view, with parts in vertical cross section, of a steering assembly equipped with a joint according to this invention.

Figure 2 is a view similar to Figure 1, but illustrating the top stud moved to its maximum tilted position without moving the housing.

Figure 3 is a view similar to Figure 2, but illustrating the maximum angular position for the assembly.

Figure 4 is a horizontal cross-sectional view taken along the line IV—IV of Figure 2.

As shown on the drawings:

In Figures 1 to 3 inclusive, the reference numeral 10 designates generally the joint of this invention articulately connecting a tie rod 11 with a steering arm 12. The steering arm 12 has a wide range of vertical movement and, since the tie rod 11 must tilt to accommodate this vertical movement, the joint 10 must be such that its parts can tilt through a wide angle.

The joint 10 includes a first stud 13, a second stud 14, and a housing 15 for the studs. The stud 13 has a hollow fragmental spherical head 13a, a cylindrical neck portion 13b extending from the head 13a, a tapered shank portion 13c converging from the neck 13b, and a threaded end portion 13d at the converging end of the tapered portion 13c. The tie rod 11 has an eye end 11a with a tapered bore therethrough receiving the tapered shank 13c. A nut 16 is threaded on the threaded portion 13d of the stud to secure the stud in the eye end 11a.

The stud 14 is similar to the stud 13 and includes a hollow fragmental spherical head 14a disposed in the housing 15, a cylindrical neck 14b projecting through the housing from the head 14a, a tapered shank portion 14c converging from the neck 14b, and a cylindrical threaded end 14d at the converging end of the tapered portion 14c. The steering arm has an eye end 12a with a tapered bore therethrough receiving the tapered shank portion 14c of the stud 14. A nut 17 is threaded on the threaded end 14d to secure the stud shank to the eye end 12a.

The studs 13 and 14 are thus respectively fixed to the tie rod and steering arm.

The housing 15 is composed of a female part 18 receiving the stud head 13a and a male part 19 receiving the stud head 14a.

The female housing part 18 has an aperture through the end thereof defined by a tapered wall 18a. The aperture receives the neck portion 13b of the stud freely therethrough. A fragmental spherical bearing wall 18b diverges from the wall 18a to an end face 18c. This end face is surrounded by a skirt 18d.

A seat ring 20 is disposed around the stud head 13a and rides on the bearing wall 18b.

An end plate 21 is bottomed on the end face 18c and has a central aperture 21a therethrough.

The male housing part 19 has an aperture in the end wall thereof defined by a tapered wall 19a and a fragmental spherical bearing wall 19b diverges from the wall 19a to a flat end face 19c. An outturned flange 19d is provided around the housing part 19 adjacent the end face 19c and this flange fits in the skirt 18d of the female housing part 18, to seat the end face 19c against the plate 21. The skirt 18d is then crimped or spun under the flange 19d to lock the housing parts together. A seat ring 22 is disposed around the stud head 14a and rides on the housing wall 19b.

The bearing walls 18b and 19b have a common center C so that the bearing rings 20 and 22 will always tilt about the same center point.

In order to maintain the bearing rings 20 and 22 on the bearing walls 18b and 19b, and in order to maintain the heads 13a and 14a in bearing relation with the rings, hemispherical hollow cups 23 and 24 are respectively seated in the hollow heads 13a and 14a. Each of these hollow heads has a semi-spherical recess for receiving the cup.

Each cup 23 and 24 has a hole punched through the dome thereof for displacing metal therefrom to form inwardly projecting spring-centering lugs 23a and 24a respectively which receive therearound the opposite end coils of a single helical spring 25. This helical spring 25 projects through the aperture 21a of the plate 21 and is under compression to urge the cups 23 and 24 apart thereby forcing the stud heads 13a and 14a into full bearing relation with their associated bearing rings 20 and 22, and, in turn, forcing these bearing rings into bearing relation with the bearing walls 18b and 19b respectively.

Rubber dust covers 26 are provided for sealing the interior of the joint housing 15. These rubber covers have umbrella-like flanges seating on the end walls of the housing parts 18 and 19 together with central collar portions snugly disposed around the shanks of the studs. The eye ends 11a and 12a of the tie rod 11 and steering arm 12 thrust against the collars of the dust covers to maintain the umbrella-like flanges in sealing relation on the end walls of the housing.

A lubricant fitting 27 is threaded into an apertured hole provided in the female housing part 18 for supplying lubricant to the interior of the housing. Lubricant introduced through the fitting 27 can flow through the aperture 21a of the plate 21 into the housing part 19. All of the bearing walls will thus be lubricated from a single fitting.

As illustrated in Figure 2, when the steering arm 12 is raised, the housing 15 will raise therewith, and the angular position of the tie rod 11 will be accommodated by movement of the stud 13 in the housing, until the neck 13b of the stud shank thrusts against the wall 18a of the female housing part 18. Angular movement throughout a predetermined angular range is thus accommodated by tilting movement of the stud 13 relative to its housing.

As illustrated in Figure 3, continued raising of the steering arm 12 results in further tilting of the tie rod 11 and this additional tilting is accommodated by tilting of the housing 15 on the stud 14. As shown, the stud 13 thrusts against the housing wall 18a to carry the housing therewith and cause it to tilt on the stud 14. The housing can tilt until the wall 19a thereof strikes the neck 14b of the stud 14.

Since both studs 13 and 14 tilt about the same common center C, the effective length of the linkage is never changed irrespective of the tilted relationship of the stud and housing. Endwise movement of the tie rod, therefore, always produces the same movement of the steering arm, irrespective of the tilted position of the tie rod.

As a result a floating housing 15 can be used to articulately connect the studs 13 and 14.

Since the housing 15 floats and coacts with the studs to increase the permissible tilting range of the assembly, the apertures receiving the stud shanks can be kept to a minimum size, and the heads of the studs can be small enough to be retained in the housing and still be formed by cold heading or upsetting operations.

From the above descriptions it will, therefore, be evident that the joints of this invention accommodate a wide range of angular movements and avoid the necessity for heretofore required large stud heads.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint assembly comprising a floating housing, studs having heads tiltably mounted in and carried by said housing and shanks projecting freely from said housing, and said housing being arranged to move with one stud relative to the other stud whenever the shank of said one stud strikes against the housing.

2. A joint construction comprising a housing having opposed bearing walls accommodating tilting movements, said bearing walls having a common center point, opposed studs having head portions tiltably mounted on said bearing walls and shank portions projecting in opposite directions from said housing, and a single spring means disposed between the head portions of said studs urging the stud heads into good bearing relation with the housing.

3. A joint comprising a housing having opposed bearing walls and apertured ends, first and second studs having heads disposed in said housing and shanks projecting through said apertured ends, a spring between the stud heads urging the studs into good bearing relation with the housing, said studs having a common tilting center, and said housing having aperture-defining walls adapted to receive the stud shanks thereagainst to tilt the housing with one of the studs relative to the other stud.

4. A linkage assembly comprising first and second members having eye ends, studs fixedly secured in said eye ends and having head portions accommodating tilting movements, a floating housing having opposed bearing walls tiltably receiving the head portions of the studs, said opposed bearing walls of the housing having the same center point, a spring member between the head portions of the stud urging the head portions of the studs into good bearing relationship with the housing, and said housing adapted to be tilted with one stud relative to the other stud.

5. A joint comprising a male housing part having an apertured end wall and a fragmental spherical recess, a stud having a shank portion projecting through the apertured end wall of said male housing part and a head portion tiltably mounted on the wall of the recess thereof, a female housing part receiving the end portion of said male housing part and having a fragmental spherical recess and an apertured end wall opposite the apertured end wall of the male housing part, a second stud having a shank projecting through the apertured end wall of the female housing part and a head portion tiltable on the wall of the recess of said female housing part, a single spring between the head portions of the studs urging the stud head portions into good bearing relationship with the walls of the recesses of the housing parts, means securing the male and female housing parts together, dust caps sealing the apertured end walls of the housing parts, and a single lubricant fitting threaded in one of said members to lubricate the joint parts.

6. A joint comprising a housing having opposed male and female parts, said male and female parts having apertured end walls, a plate between said parts, means on the female part crimped over a portion of the male part to hold the parts together, said male and female parts having bearing walls therein accommodating tilting movements, said bearing walls having a common center point, studs projecting through the apertured end walls of the housing parts having hollow head portions tiltable on said bearing walls, hollow cup members in said heads of the studs, a spring between said cup members urging the cup members apart, and lugs on said cup members receiving the end coils of said spring to hold the spring in position.

7. A joint assembly comprising a first housing part having an apertured end, a recessed bearing wall diverging from said apertured end, an end face at the divergent end of said recess, an annular skirt surrounding said end face, and an apertured plate in said skirt bottomed on said end face; a second housing part having an end face bottomed on said plate, an outturned flange within said skirt, a recessed bearing wall converging from said end face, and an apertured end at the convergent end of said recess; a portion of the skirt of said first housing part being crimped under the flange of said second housing part to lock the housing parts together; said recesses of the housing parts having a common center point; studs having shanks projecting freely through said apertured ends of the housing parts and hollow head portions disposed in the recesses of said housing parts; seating rings on said head portions of the stud riding on said bearing walls of the housing parts; fragmental spherical cup members seated in said hollow stud heads having pierced holes in the domes thereof defining inwardly projecting lugs; and a coil spring between said cup members having the opposed end coils thereof disposed around said lugs and acting on said cups to urge the studs apart for maintaining the seating rings on the bearing walls of the housing parts.

8. In combination, a steering arm, a tie rod, a first stud secured to said tie rod, a second stud secured to said steering arm, and a floating housing supporting said studs for tilting movement about a common center point and adapted to transmit steering movements between the arm and rod irrespective of the relative tilted positions of the studs.

9. In a steering assembly including a pair of headed studs, the improvement of a floating housing receiving the heads of said studs therein in articulate bearing relation thereto, said housing being engageable by and tiltable with one stud relative to the other stud to increase the tilting range of the studs.

JAMES H. BOOTH.

REFERENCES CITED

The following references are of record in the file of this patent:

UNITED STATES PATENTS

| Number | Name | Date |
| --- | --- | --- |
| 444,662 | Clark | Jan. 13, 1891 |
| 1,968,925 | Barish | Aug. 7, 1934 |
| 2,049,502 | Hufferd et al. | Aug. 4, 1936 |
| 2,176,524 | Denoix | Oct. 17, 1939 |
| 2,383,378 | Flumerfelt | Aug. 21, 1945 |

FOREIGN PATENTS

| Number | Country | Date |
| --- | --- | --- |
| 506,246 | Germany | Sept. 1, 1930 |